(12) United States Patent
Appachiappan et al.

(10) Patent No.: US 9,379,949 B2
(45) Date of Patent: Jun. 28, 2016

(54) SYSTEM AND METHOD FOR IMPROVED END-USER EXPERIENCE BY PROACTIVE MANAGEMENT OF AN ENTERPRISE NETWORK

(71) Applicant: WIPRO LIMITED, Bangalore (IN)

(72) Inventors: Mageswari Appachiappan, Bangalore (IN); Sudipta Ghosh, Kolkata (IN); Kumaran Rangaswamy, Bangalore (IN); Shambhulingaya Aralelemath, Bangalore (IN)

(73) Assignee: Wipro Limited, Bangalore (IN)

( * ) Notice: Subject to any disclaimer, the term of this patent is extended or adjusted under 35 U.S.C. 154(b) by 412 days.

(21) Appl. No.: 13/850,319

(22) Filed: Mar. 26, 2013

(65) Prior Publication Data

US 2013/0304905 A1    Nov. 14, 2013

(51) Int. Cl.
*H04L 12/24* (2006.01)
*G06Q 10/06* (2012.01)
*H04L 12/26* (2006.01)

(52) U.S. Cl.
CPC ........ *H04L 41/5009* (2013.01); *H04L 41/5032* (2013.01); *G06Q 10/06395* (2013.01); *H04L 41/5067* (2013.01); *H04L 43/04* (2013.01)

(58) Field of Classification Search
CPC . H04L 41/5009; H04L 41/00; H04L 41/5067; H04L 41/5032; H04L 43/04; G06Q 10/06395
See application file for complete search history.

(56) References Cited

U.S. PATENT DOCUMENTS

| | | | | |
|---|---|---|---|---|
| 5,696,701 A | * | 12/1997 | Burgess et al. | 714/25 |
| 7,930,393 B1 | * | 4/2011 | Baumback et al. | 709/224 |
| 2005/0144151 A1 | * | 6/2005 | Fischman | G06N 5/045 706/45 |
| 2006/0229931 A1 | * | 10/2006 | Fligler et al. | 705/10 |
| 2006/0242282 A1 | * | 10/2006 | Mullarkey | H04L 41/5003 709/223 |
| 2009/0075648 A1 | * | 3/2009 | Reed | H04L 41/0816 455/424 |
| 2013/0031242 A1 | * | 1/2013 | Raghavendran et al. | 709/224 |

* cited by examiner

*Primary Examiner* — Oleg Survillo
*Assistant Examiner* — Jihad Boustany
(74) *Attorney, Agent, or Firm* — LeClairRyan, a Professional Corporation (57) ABSTRACT

A method for improved end-user experience in an enterprise network is disclosed. In one embodiment, key performance indicators (KPIs) of network devices, applications and input services are determined. Further, KPIs of base services are determined using the KPIs of network devices, applications and input services. Furthermore, the KPIs are compared with KPI threshold levels and KPI level alerts are generated. Moreover, key quality indicators (KQIs) of base services are determined using the KPIs. Also, the KQIs are compared with KQI threshold levels and KQI level alerts are generated. Further, a composite service quality (CSQ) index of a composite service is computed using the KQIs. Furthermore, the CSQ index is compared with CSQ index threshold levels and a CSQ level alert is generated. In addition, possible problem conditions are detected and then possible problem scenarios are determined and analyzed. Also, actionable items are identified based on the possible problem scenarios.

15 Claims, 3 Drawing Sheets

SYSTEM AND METHOD FOR IMPROVED END-USER EXPERIENCE BY PROACTIVE MANAGEMENT OF AN ENTERPRISE NETWORK

RELATED APPLICATIONS

Benefit is claimed under 35 U.S.C 119(a) to. Indian Provisional Application Ser. No. 1364/CHE/2012 entitled "Method and system for assessment and monitoring of quality of end-user experience in an enterprise network" by Wipro Limited filed on Mar. 30, 2012 and Indian Application Ser. No. 878/CHE/2013 entitled "SYSTEM AND METHOD FOR IMPROVED END-USER EXPERIENCE BY PROACTIVE MANAGEMENT OF AN ENTERPRISE NETWORK" by Wipro Limited filed on Feb. 28, 2013.

TECHNICAL FIELD

Embodiments of the present subject matter relate to an enterprise network. More particularly, embodiments of the present subject matter relate to improved end-user experience by proactive management of the enterprise network.

BACKGROUND

Typically, an enterprise network include heterogeneous technologies, diverse products and varied designs, that are developed or evolved due to organizations existence since several years and also due to change in business needs. Currently, the organizations have multi-location offices and different types of networks spread across a globe. The networks include data centre networks, corporate networks, branch office networks (wired as well as wireless networks), wide area networks (WANs) and so on. Legacy technologies like frame-relay, asynchronous transfer mode (ATM) and time division multiplexing (TDM) voice being transitioned to multiprotocol label switching (MPLS), metro Ethernet, Gig Ethernet, fiber channel over Ethernet (FCoE), load balancers, wireless, converged Internet protocol (IP) voice, video and multi-media communication and the like. Organization embarking to cloud has also put additional load on the network.

Generally, each of the networks is monitored and managed by several different network devices using different types of tools. Further, assessment of end-user experience is performed, by an expertise, by analyzing various inputs. Existing techniques obtain the inputs either from the tools or by conducting manual surveys with end-users. However, conducting manual surveys do not provide scientific information as feedback provided by the end-users is more related to currently faced issues, if any, rather than consistent feedback for a period of the manual survey. Thus, the existing techniques do not provide useful inputs on network performance that could facilitate fast alleviation of end-user experience, if degradation in the network performance is detected. Hence, the existing techniques do not address network holistically and do not provide a comprehensive view of what level of service (voice, video or data) is provided to the end-user.

SUMMARY

A system and method for improved end-user experience by proactive management of an enterprise network are disclosed. According to one aspect of the present subject matter, performance data associated with multiple network devices, applications and input services is obtained. Further, the obtained performance data in a specific format is transformed to a conducive format or to enhance the obtained performance data. A key performance indicator (KPI) of each of the multiple network devices, applications and input services in the enterprise network is then determined using associated performance data. A KPI of each of a plurality of base services is then determined using the KPIs of associated network devices, applications and input services in the enterprise network. Furthermore, the determined KPI of each of the plurality of base services is compared with predetermined KPI threshold levels and one or more KPI level alerts are generated based on an outcome of the comparison. Moreover, a key quality indicator (KQI) of each of the plurality of base services is determined using the KPIs of the associated base services upon generating the one or more KPI level alerts. Also, the determined KQI of each of the plurality of base services is compared with predetermined KQI threshold levels and one or more KQI level alerts are generated based on an outcome of the comparison.

Further, a composite service quality (CSQ) index of a composite service is computed using the KQIs of the associated base services upon generating the one or more KQI level alerts. For example, the composite service is a set of base services. Furthermore, the computed CSQ index is compared with predetermined CSQ index threshold levels and a CSQ level alert is generated based on an outcome of the comparison. In addition, one or more possible problem conditions are detected upon generating the CSQ level alert. Moreover, one or more possible problem scenarios are determined and analyzed upon detecting the one or more possible problem conditions. Also, one or more actionable items are identified based on the one or more analyzed possible problem scenarios.

According to another aspect of the present subject matter, an end-user experience management server includes a processor and memory coupled to the processor. Further, the memory includes an end-user experience management module configured to perform the method described above.

According to yet another aspect of the present subject matter, a non-transitory computer-readable storage medium for improved end-user experience by proactive management of the enterprise network, having instructions that, when executed by a computing device causes the computing device to perform the method described above.

According to one aspect of the present subject matter, the end-user experience management module includes a data import and translation module (DITM), a performance measurement module (PMM), a user experience assessment module (UEAM), an analytics module (AM), and an alert and notification module (ANM) communicatively coupled to each other. In one embodiment, the DITM obtains the performance data associated with the multiple network devices, applications and input services. Further, the DITM transforms the obtained performance data in the specific format to the conducive format or to enhance the obtained performance data. Furthermore, the PMM determines the KPI of each of a plurality of base services using the KPIs of associated network devices, applications and input services in the enterprise network. In addition, the ANM compares the determined KPI of each of the plurality of base services with the predetermined KPI threshold levels and generates the one or more KPI level alerts based on the outcome of the comparison.

Moreover, the UEAM determines the KQI of each of the plurality of base services using the determined KPIs of the associated base services, obtained from the PMM, upon the one or more KPI level alerts are generated by the ANM. Also, the ANM compares the determined KQI of each of the plurality of base services, obtained from the UEAM 306, with the predetermined KQI threshold levels and generates one or more KQI level alerts based on the outcome of the comparison. Further, the UEAM computes the CSQ index of the composite service using the KQIs of the associated base services upon the one or more KQI level alerts are generated by the ANM. Furthermore, the ANM compares the computed CSQ index, obtained from the UEAM, with the predetermined CSQ index threshold levels and generates the CSQ level alert based on the outcome of the comparison. In addition, the UEAM detects the one or more possible problem conditions upon the CSQ level alert is generated by the ANM. Moreover, the UEAM and AM determines and analyzes the one or more possible problem scenarios upon detecting the one or more possible problem conditions. Also, the UEAM identifies the one or more actionable items based on the one or more analyzed possible problem scenarios.

The systems and methods disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for improved end-user experience by proactive management of an enterprise network are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
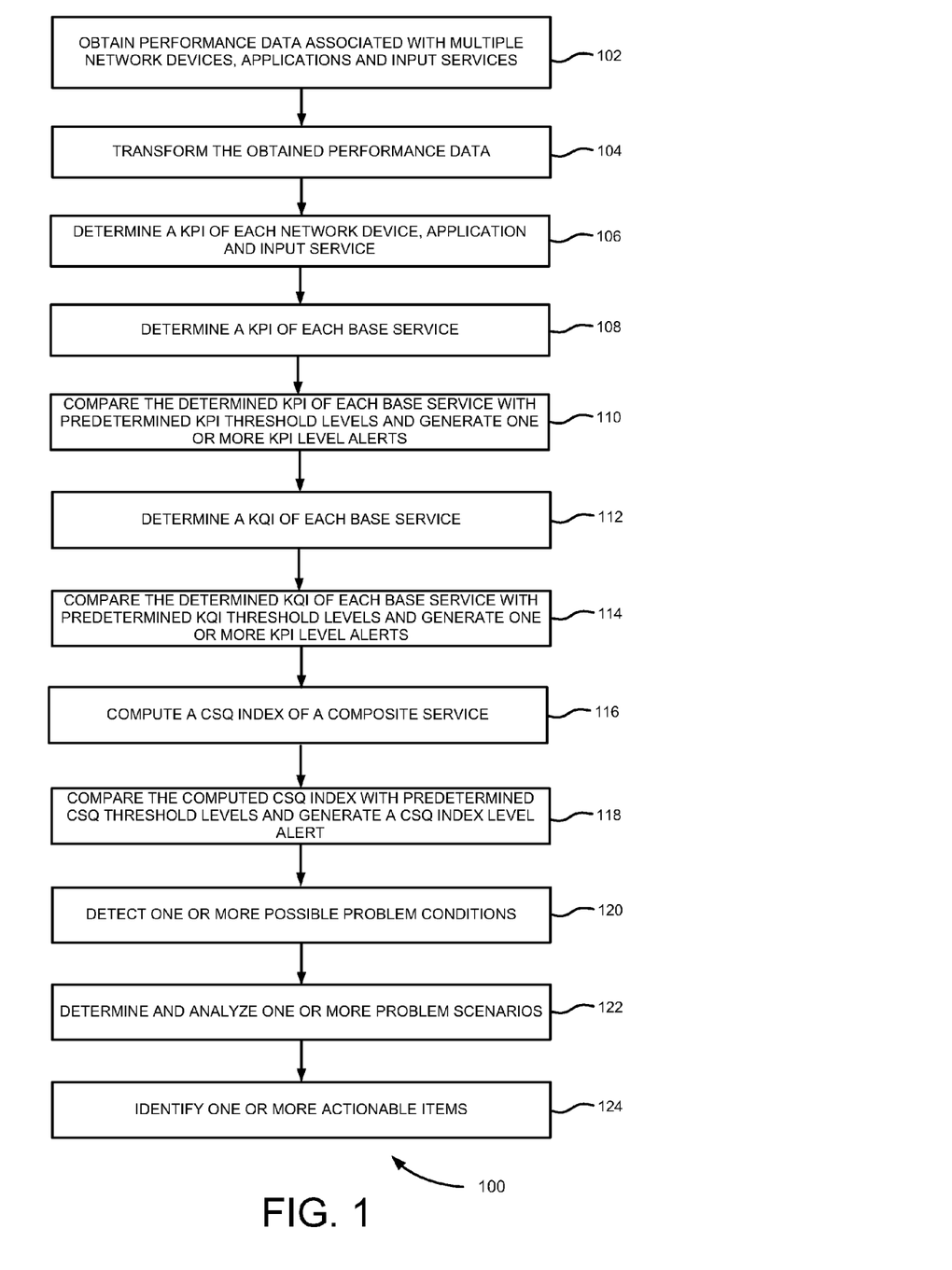
FIG. 1 illustrates a flowchart of a method for improved end-user experience by proactive management of an enterprise network, according to one embodiment.

FIG. 1 illustrates a flowchart 100 of a method for improved end-user experience by proactive management of an enterprise network, according to one embodiment. At block 102, performance data associated with the multiple network devices, applications and input services is obtained. For example, the performance data includes availability information, performance metrics and health information associated with each network device, application and input service in the enterprise network. At block 104, the obtained performance data in a specific format is transformed to a conducive format or to enhance the obtained performance data. At block 106, a key performance indicator (KPI) of each of the multiple network devices, applications and input services in the enterprise network is determined using the associated transformed data. At block 108, a KPI of each of a plurality of base services is determined using the KPIs of associated network devices, applications and input services in the enterprise network. For example, the base service is a service received as a result of combined use of one or more of the multiple network devices, applications and/or input services. At block 110, the determined KPI of each of the plurality of base services is compared with predetermined KPI threshold levels and one or more KPI level alerts are generated based on an outcome of the comparison.

At block 112, a key quality indicator (KQI) of each of the plurality of base services is determined using the determined KPIs of the associated base services upon generating the one or more KPI level alerts. At block 114, the determined KQI of each of the plurality of base services is compared with predetermined KQI threshold levels and one or more KQI level alerts are generated based on an outcome of the comparison. At block 116, a composite service quality (CSQ) index of a composite service is computed using the KQIs of the associated base services upon generating the one or more KQI level alerts. For example, the composite service is a set of base services. For example, the CSQ index is computed using an equation:

$$\text{CSQ index} = \sum_{i=1}^{N} W_i \text{KQI}_i$$

wherein, $\text{KQI}_i$ are the key quality indicators of the base services and $W_i$ are weightages for the KQIs.

At block 118, the computed CSQ index is compared with predetermined CSQ index threshold levels and a CSQ level alert is generated based on an outcome of the comparison. For example, the predetermined CSQ index threshold levels include a CSQ index minimum value, a CSQ index maximum value and a range of CSQ index optimal values. In one embodiment, the predetermined CSQ index threshold levels are adjusted using a user profile based sensitivity factor.

At block 120, one or more possible problem conditions are detected upon generating the CSQ level alert. In one embodiment, a current CSQ index of the composite service is computed. Further, a CSQ trend is determined based on the previously computed CSQ indices within a predetermined time interval and current CSQ index. Furthermore, the possible problem conditions are detected if the current CSQ index is not within the range of CSQ index optimal values and if the current CSQ index is near to a lower limit of the range of CSQ index optimal values and the CSQ trend is negative.

At block 122, one or more possible problem scenarios are determined and analyzed upon detecting the one or more possible problem conditions. In one embodiment, a problem context is formed using the current CSQ index of the composite service, the KPIs and KQIs of the associated base services, the KPIs and performance data of associated network devices, applications and input services, the one or more KPI level alerts, the one or more KQI level alerts, the CSQ level alert and current enterprise network context upon detecting the one or more possible problem conditions. Further, the one or more possible problem scenarios are determined using the formed problem context. Furthermore, information associated with the formed problem context is analyzed and one or more KPIs and associated base services, network devices, applications and input services responsible for violation of the CSQ index are identified. At block 124, one or more actionable items are identified based on the one or more analyzed possible problem scenarios. In one exemplary implementation, the actionable items are identified based on the identified KPIs and associated base services, network devices, applications and input services responsible for violation of the CSQ index. In some embodiments, the actionable items and the problem context are stored. Further, actual problem resolution information is updated and necessary knowledge is created based on the complete information related to a problem upon actual resolution of the problem.

Figure 2:
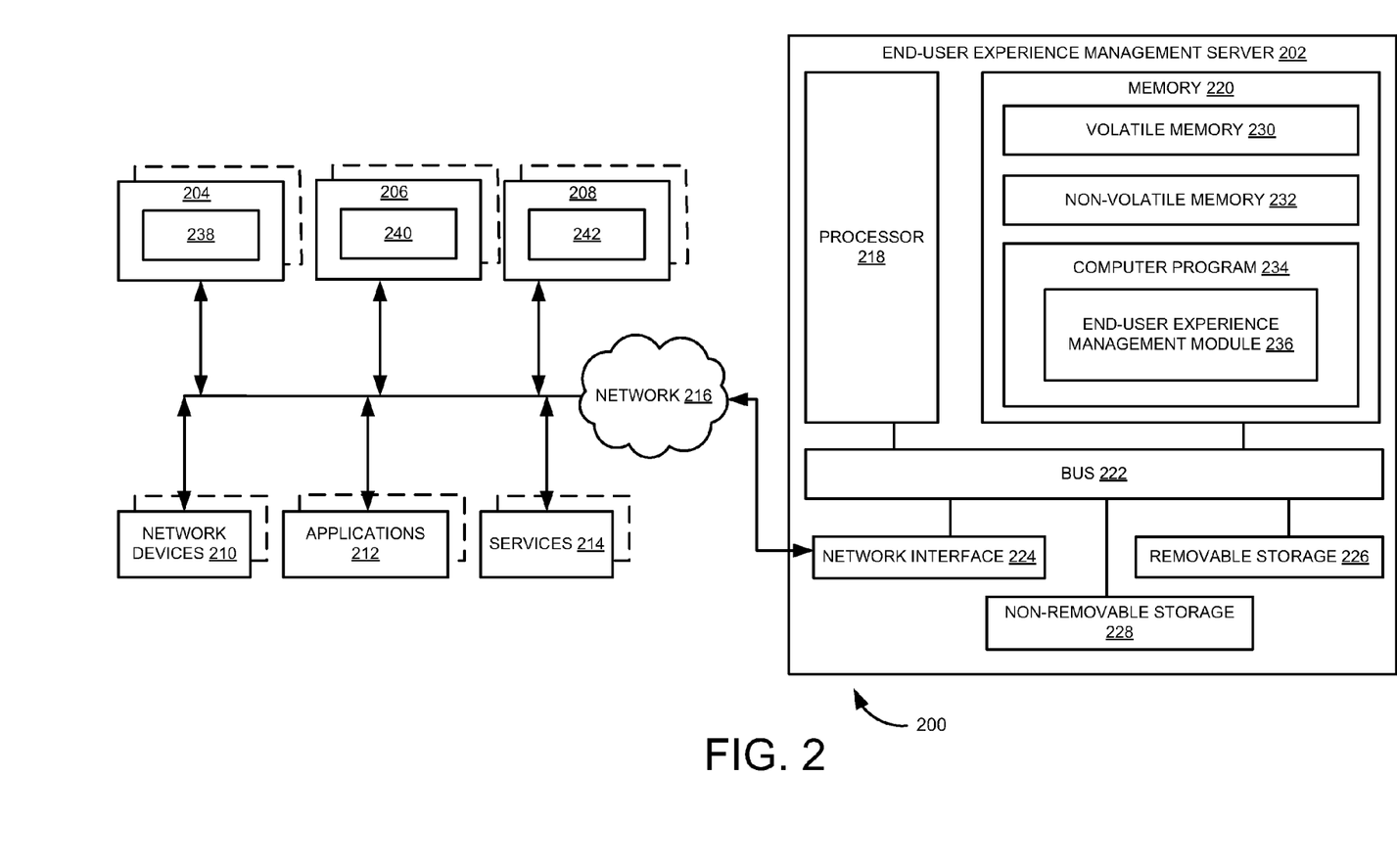
FIG. 2 illustrates a system for improved end-user experience by proactive management of the enterprise network, using the process of FIG. 1, according to one embodiment.

Referring now to FIG. 2, which illustrates a system 200 for improved end-user experience by proactive management of the enterprise network, using the process of FIG. 1, according to one embodiment. As shown in FIG. 2, the system 200 includes an end-user experience management server 202, one or more application management servers 204, one or more network management servers 206, one or more service management servers 208, multiple network devices 210, multiple applications 212 and multiple input services 214. Further, each of the application management servers 204 includes an application management tool 238. Furthermore, each of the network management servers 206 includes a network management tool 240. In addition, each of the service management servers 208 includes a service management tool 242. Moreover, the end-user experience management server 202 includes a processor 218, memory 220, a removable storage 226, and a non-removable storage 228. The processor 218, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 218 also includes embedded controllers, such as generic or programmable logic devices or arrays, application specific integrated circuits, single-chip computers, smart cards, and the like.

The end-user experience management server 202 additionally includes a bus 222 and a network interface 224. The memory 220 further includes volatile memory 230 and non-volatile memory 232. A variety of computer-readable storage media are stored in and accessed from the memory elements of the end-user experience management server 202, such as the volatile memory 230 and the non-volatile memory 232, the removable storage 226 and the non-removable storage 228. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like. Further, the memory 220 includes a computer program 234. As shown in FIG. 2, the computer program 234 includes the end-user experience management module 236. Furthermore, the end-user experience management server 202, the application management servers 204, the network management servers 206, the service management servers 208, the network devices 210, the applications 212 and the input services 214 are communicatively coupled to each other.

In operation, each application management tool 238 gathers information on application(s) 212, user(s) of the applications 212, inter-relations between applications 212, interrelations between applications 212 & users and the like and sends performance data including availability information, performance metrics and health information associated with the applications 212 in the enterprise network to the end-user experience management server 202 via a network 216. Further, each network management tool 240 gathers information on network performance matrices, traffic pattern, resource utilization, user and application sessions, problems/faults, and the like and sends the performance data including availability information, performance metrics and health information associated with the network devices 210 in the enterprise network to the end-user experience management server 202 via the network 216. Furthermore, each service management tool 242 provide information on performance matrices and other information related to input service configuration, input service mappings and dependencies, and the like and sends the performance data including availability information, performance metrics and health information associated with the input services 214 in the enterprise network to the end-user experience management server 202 via the network 216.

In addition, the end-user experience management module 236 obtains the performance data associated with the multiple network devices 210, applications 212 and input services 214 from the one or more application management servers 204, one or more network management servers 206, and one or more service management servers 208. Moreover, the end-user experience management module 236 transforms the obtained performance data in a specific format to a conducive format or to enhance the obtained performance data. Also, the end-user experience management module 236 determines a KPI of each of the multiple network devices 210, applications 212 and input services 214 in the enterprise network using the associated transformed data. Further, the end-user experience management module 236 determines a KPI of each of a plurality of base services using the KPIs of associated network devices 210, applications 212 and input services 214 in the enterprise network.

Furthermore, the end-user experience management module 236 compares the determined KPI of each of the plurality of base services with predetermined KPI threshold levels and generates one or more KPI level alerts based on an outcome of the comparison. In addition, the end-user experience management module 236 determines a KQI of each of the plurality of base services using the determined KPIs of the associated base services upon generating the one or more KPI level alerts. Also, the end-user experience management module 236 compares the determined KQI of each of the plurality of base services with predetermined KQI threshold levels and generates one or more KQI level alerts based on an outcome of the comparison. Moreover, the end-user experience management module 236 computes a CSQ index of a composite service using the KQIs of the associated base services upon generating the one or more KQI level alerts. For example, the composite service is a set of base services.

Further, the end-user experience management module 236 compares the computed CSQ index with predetermined CSQ index threshold levels and generates a CSQ level alert based on an outcome of the comparison. Furthermore, the end-user experience management module 236 detects one or more possible problem conditions upon generating the CSQ level alert. In addition, the end-user experience management module 236 determines and analyzes one or more possible problem scenarios upon detecting the one or more possible problem conditions. Also, the end-user experience management module 236 identifies one or more actionable items based on the one or more analyzed possible problem scenarios. This is explained in more detailed with reference to FIG. 3.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 218 of the end-user experience management server 202. For example, the computer program 234 includes machine-readable instructions capable for improving end-user experience by proactive management of the enterprise network, according to the teachings and herein described embodiments of the present subject matter. In one embodiment, the computer program 234 is included on a compact disk-read only memory (CD-ROM) and loaded from the CD-ROM to a hard drive in the non-volatile memory 232. The machine-readable instructions cause the end-user experience management server 202 to encode according to the various embodiments of the present subject matter.

For example, the end-user experience management module 236 can be in the form of instructions stored on a non-transitory computer-readable storage medium. The non-transitory computer-readable storage medium having the instructions that, when executed by the end-user experience management server 202, causes the end-user experience management server 202 to perform the method described above.

Figure 3:
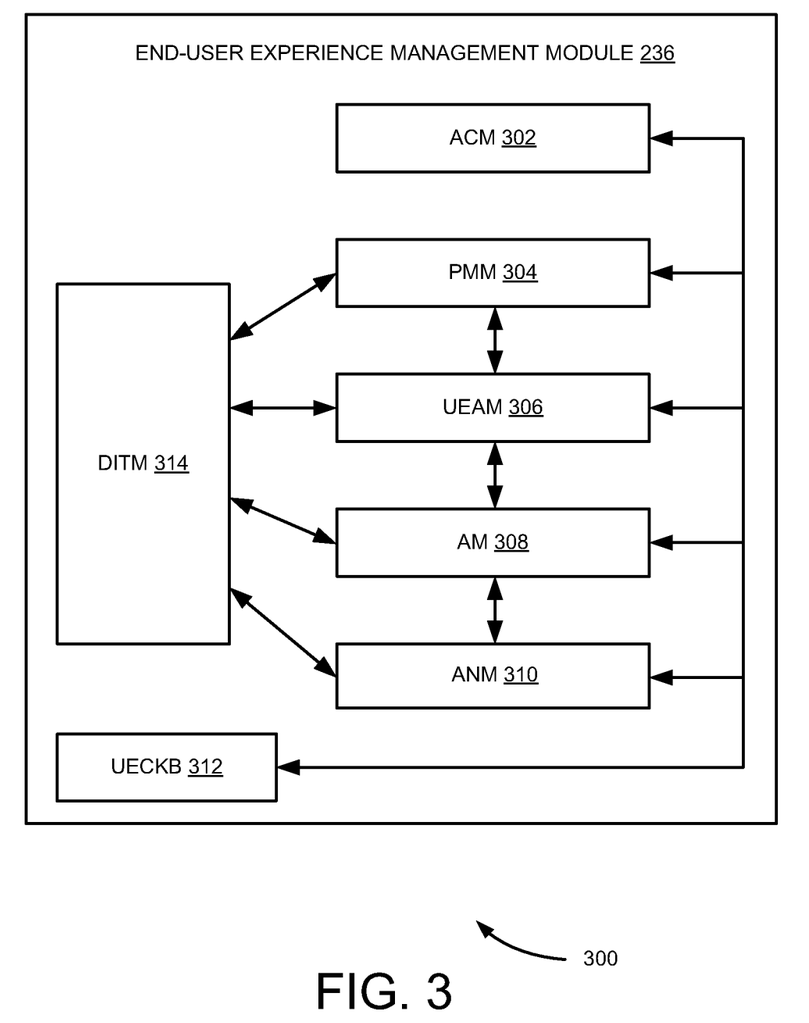
FIG. 3 illustrates a block diagram including major components of an end-user experience management module, such as the one shown in FIG. 2, according to one embodiment.

Referring now to FIG. 3, which illustrates a block diagram 300 including major components of the end-user experience management module 236, such as the one shown in FIG. 2, according to one embodiment. As shown in the FIG. 3, the end-user experience management module 236 includes an administrator and configuration module (ACM) 302, a performance measurement module (PMM) 304, a user experience assessment module (UEAM) 306, an analytics module (AM) 308, an alert and notification module (ANM) 310, a user experience and causality knowledge base (UECKB) 312 and a data import and translation module (DITM) 314. Further, the ACM 302, PMM 304, UEAM 306, AM 308, ANM 310, UECKB 312 and DITM 314 are communicatively coupled to each other.

In one embodiment, the UECKB 312 is a knowledge base and primarily maintains industry benchmark (IB) related to the performance of the network devices, applications and input services rendered (e.g., the network devices 210, applications 212 and input services 214 of FIG. 2), baseline details, performance matrices, transformed data and corresponding user experience information and various contextual & trend information. For example, the baseline details are the network device, application or input service performance baselines, threshold baselines, and the like. In this example, the performance baseline is estimated for the current enterprise network using the IB values, corresponding performance matrices and controllable parameters. For example, the performance matrices are derived from the performance need of the enterprise and corresponding operating thresholds. Further, the performance need is derived from the enterprise need and is governed by a performance policy, which is organizational specific.

Furthermore, the performance policy of the organization is usually defined during a network planning phase and can be revised from time to time based on the need of the organization. Typically, the performance policy covers the service levels at a high level. During steady state operation, the predetermined threshold levels, accepted-ranges and weightages for CSQs, KQIs and KPIs are tuned/improved by the UECKB 312 based on historical information and new knowledge harvested. During trial phase of implementation, the current performance matrices are measured and compared with the detailed performance policy. If the current values are out-side acceptable limits, then the enterprise network is tuned to bring these values within the allowable limits as defined in the performance policy. Also, the operational thresholds are defined using the performance baseline. They further have variations and tolerance factors for different thresholds depending on an operational context. For example, the operational context may include factors, such as a network capacity, a utilization load, a time of the day/month, year, and the like. The controllable parameters are the configurable parameters of the enterprise network that controls or influences the performance matrices of the enterprise network. All the various baselines values changes depending upon change in the policy, IB or network infrastructure, and the like. Further, the UECKB 312 continues to record past performance measurement information, assessed user experience information, causality information with regards to past performance degradation cases and associated actionable items.

In one embodiment, the ACM 302 prominently interfaces with the UECKB 312 and defines the composite service. The composite service includes a list of related base services to be used by a user to perform a specific work. For example, the composite service is a group conference service used while conducting a conference/symposium for a group of attendees inside a facility. In the group conference service, a user uses different base services like a voice service, a video streaming service, a file sharing service and the like. Further, the ACM 302 maps the CSQ index of the composite service to the base services and defines the relationship between the CSQ index and KQIs of the base services. In some embodiments, weightage based KQIs are used to define the CSQ index. For example, initial weightages for the KQIs are defined by the user or derived from service-specialist's experience and/or industry.

Furthermore, the ACM 302 maps the KQIs of the base services to KPIs of the base services. In some embodiments, weightage based KPIs are used to define the KQIs. For example, initial weightages for the KPIs are defined by the user or derived from service-specialist's experience and/or industry. In addition, the ACM 302 maps the KPIs to controllable parameters of the enterprise network based on the service-specialist's experience and/or industry.

The ACM 302 further defines predetermined KPI threshold levels and predetermined KQI threshold levels for each of the base services. The ACM 302 then defines predetermined CSQ index threshold values for each composite service using the predetermined KQI threshold levels of the associated base services along with the associated weightages. For example, the predetermined CSQ index threshold levels include a CSQ index minimum value, a CSQ index maximum value and a range of CSQ index optimal values. The CSQ index minimum value represents minimum threshold value for the CSQ-index that represents the bare minimum CSQ index below which the user cannot function. The range of CSQ index optimal values represents the optimal threshold CSQ-index that represents an optimal level of user experience. The CSQ index maximum value represents maximum limit of CSQ index possible in the current network context for that particular service. Similarly, the predetermined KPI threshold levels and predetermined KQI threshold levels include a minimum value, a maximum value and a range of optimal values. For example, the ACM defines the predetermined CSQ index threshold levels, predetermined KQI threshold levels and predetermined KPI threshold levels based on service-specialist's experience and/or values derived from industry. Moreover, the ACM 302 provides options to define user profile based sensitivity factor. For example, the user profile based sensitivity factor is based on a role of an individual or a group of users consuming one or more composite services. The user profile based sensitivity factor is used for the specific user for a particular composite service to adjust predetermined CSQ index threshold levels in order to manipulate the CSQ-index.

In operation, the DITM 314 obtains the performance data associated with the multiple network devices, applications and input services from the one or more application management servers, one or more network management servers, and one or more service management servers (e.g., the one or more application management servers 204, one or more network management servers 206, and one or more service management servers 208 of FIG. 2) in the enterprise network. Further, the DITM 314 transforms the obtained performance data in a specific format to a conducive format or to enhance the obtained performance data. Furthermore, the PMM 304 determines the KPI of each of the multiple network devices, applications and input services in the enterprise network using the associated transformed data obtained from the DITM 314.

In addition, the PMM 304 determines the KPI of each of the plurality of base services using the determined KPIs of associated network devices, applications and input services in the enterprise network. Moreover, the ANM 310 compares the determined KPI of each of the plurality of base services, obtained from the PMM 304, with the predetermined KPI threshold levels and generates one or more KPI level alerts based on the outcome of the comparison. For example, the ANM 310 generates the KPI level alerts if the determined KPI of each of the plurality of base services is less than the minimum KPI value. In one embodiment, the ACM 302 sets the predetermined KPI threshold levels to the ANM 310 and DITM 314 and monitors at the DITM 314. In case of violation of the predetermined KPI threshold levels, the KPI level alert is generated by the ANM 310 based on a notification received through the DITM 314.

Also, the UEAM 306 determines the KQI of each of the plurality of base services using the determined KPIs of the associated base services, obtained from the PMM 304, upon generating the one or more KPI level alerts by the ANM 310. Further, the ANM 310 compares the determined KQI of each of the plurality of base services, obtained from the UEAM 306, with the predetermined KQI threshold levels and generates the one or more KQI level alerts based on the outcome of the comparison. In one embodiment, the ACM 302 sets the predetermined KQI threshold levels to the ANM 310 and the KQI level alerts are generated by the ANM 310 based on violations of the predetermined KQI threshold levels. In one exemplary implementation, upon generating the KPI level alert, the ANM 310 refers to the UECKB 312 to identify if the KPI threshold violation has significant impact on the KQI. In case the impact is significant, the ANM 310 generates the KQI level alert. In case the impact is not significant, then the ANM 310 searches for any other KPI level alerts that are generated around the same time-frame and combination impacts the KQI significantly and then generates the KQI level alert.

Further, the UEAM 306 computes the CSQ index of the composite service using the KQIs of the associated base services upon generating the one or more KQI level alerts by the ANM 310. During operation and rendering of the composite service, the UEAM 306 uses the relational data and KPIs of the base services obtained from the ACM 302 to determine the CSQ index on a semi real-time basis. In addition, the ANM 310 compares the computed CSQ index, obtained from the UEAM, with the predetermined CSQ index threshold levels and generates the CSQ level alert based on the outcome of the comparison. In one embodiment, the ACM 302 sets the predetermined CSQ index threshold levels to the ANM 310 and the CSQ level alert is generated by the ANM 310 based on violations of the predetermined CSQ index threshold levels. In one exemplary implementation, upon generating the KQI level alert, the ANM 310 refers to the UECKB 312 to identify if that KQI threshold violation has significant impact on the CSQ index. In case the impact is significant, then the ANM 310 generates the CSQ index level alert. In case, the impact is not significant, then ANM 310 searches for any other KQI related alerts that are generated around the same time-frame and combination impacts the CSQ index significantly and then generates the CSQ index level alert.

Furthermore, the UEAM 306 detects the one or more possible problem conditions upon generating the CSQ level alert. In one embodiment, the UEAM 306 computes a current CSQ index of the composite service. The UEAM 306 then determines a CSQ trend based on the previously computed CSQ indices within a predetermined time interval and the current CSQ index. In this context, the UEAM 306 uses the AM 308 for analysis of the CSQ trend. For example, the AM 308 includes a robust analytics engine which performs intelligent and context sensitive analysis of data as received from the PMM 304 and uses the data in UECKB 312 to arrive at service levels as shall be experienced by the users. The UEAM 306 then detects as the possible problem conditions if the current CSQ index is not within the range of CSQ index optimal values and if the current CSQ index is near to a lower limit of the range of CSQ index optimal values and the CSQ trend is negative.

In addition, the UEAM 306 determines and analyzes one or more possible problem scenarios upon detecting the one or more possible problem conditions using the AM 308 and UECKB 312. In one embodiment, the UEAM 306 forms a problem context using the current CSQ index of the composite service, the KPIs and KQIs of the associated base services, the KPIs and performance data of associated network devices, applications and input services, the one or more KPI level alerts, the one or more KQI level alerts, the CSQ level alert and current enterprise network context upon detecting the one or more possible problem conditions. The UEAM 306 then determines the one or more possible problem scenarios using the formed problem context.

In one exemplary implementation, the UEAM 306 refers to the UECKB 312 using the problem context for obtaining possible resolutions in case the UECKB 312 includes a historical record of such a problem or for obtaining possible resolutions in case the UECKB 312 includes historical records of similar problems. In case the UECKB 312 does not include any such record, the UEAM 306 initiates detailed analysis of information associated with the problem context using the AM 308 and relationship information, configuration information, and the like in the UECKB 312. The UEAM 306 then identifies the KPI and associated base services, network devices, applications and input services responsible for the violation of CSQ index. Further, the UEAM 306 identifies the one or more actionable items based on the identified KPI and associated base services, network devices, applications and input services responsible for the violation of CSQ index The ANM 310 then notifies the one or more actionable items to user (s) for actual resolution of the problem. Furthermore, the UEAM 306 stores the one or more actionable items and the problem context in the UECKB 312. In one embodiment, upon the actual resolution of the problem in the enterprise network, the application management servers, network device management servers and service management servers provide necessary feedback to the UECKB 312 through DITM 314. On receipt of the feedback, the UECKB 312 updates the actual problem resolution information and creates necessary knowledge on the complete information related to the problem.

In various embodiments, the systems and methods described in FIGS. 1 through 3 propose a technique for improved end-user experience by proactive management of the enterprise network. The proposed technique further identifies actionable items based on the analyzed possible problem scenarios and notifies to an authorized user (e.g. a network manager or an administrator) to facilitate the authorized user to manage and resolve a problem/fault proactively. The proposed technique takes into account the end-to-end network performance for application transactions and related services provided to end-users. This technique thus enables accurate identification of the base services, network devices, applications and/or input services and/or the users who are causing the performance bottlenecks.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for improved end-user experience by proactive enterprise network management, comprising:

obtaining, by an end-user experience management server computing device and via at least one network, performance data comprising availability data, performance metric data, and health data from each of a plurality of network devices, applications, and input services in an enterprise network;

generating, by the end-user experience management server computing device, a key performance indicator (KPI) of each of the network devices, applications and input services using the performance data, a KPI of each of a plurality of base services using the KPIs of the network devices, applications or input services associated with each of the base services, and a key quality indicator (KQI) of each of the base services using the KPIs of each of the base services:

determining, by the end-user experience management server computing device, when the KPI or KQI of one or more of the base services exceeds a predetermined KPI or KQI threshold level;

automatically generating, by the end-user experience management server computing device, a composite service quality (CSQ) index of a composite service associated with the one or more base services in real-time using the KQIs of at least the one or more base services, when the determining indicates the KPI or the KQI of the one or more base services exceeds the predetermined KPI or KQI threshold level;

determining, by the end-user experience management server computing device, when the CSQ index exceeds a predetermined CSQ index threshold level and when the determining indicates that the CSQ index exceeds the predetermined CSQ index threshold level:

determining, by the end-user experience management server computing device, when a problem resolution is maintained in the knowledge base based on a correlation of a problem context with the knowledge base, wherein the problem context comprises the CSQ index, the KPIs and KQIs of the one or more base services, and the KPIs and the performance data of one or more of the network devices, applications and input services;

outputting the problem resolution when the determining indicates the problem resolution is maintained in the knowledge base; and detecting, by the end-user experience management server computing device, one or more possible problem conditions, determining and analyzing one or more possible problem scenarios upon detecting the one or more possible problem conditions, and identifying one or more actionable items based on the one or more analyzed possible problem scenarios, when the determining indicates the problem resolution is not maintained in the knowledge base.

2. The method of claim 1, wherein the predetermined CSQ index threshold levels comprise a CSQ index minimum value, a CSQ index maximum value, or a range of CSQ index optimal values.

3. The method of claim 1, wherein detecting the one or more possible problem conditions, comprises:

determining a CSQ trend based on the one or more previously computed CSQ indices within a predetermined time interval and the CSQ index; and detecting the possible problem conditions when the CSQ trend is negative.

4. The method of claim 1, wherein analyzing the one or more determined possible problem scenarios further comprises analyzing information associated with the problem context and identifying the one or more actionable items based on another one or more KPIs and associated base services or one or more network devices, applications, or input services responsible for violation of the CSQ index.

5. The method of claim 1, further comprising updating, by the end-user experience management server computing device, the knowledge base to include problem resolution data and necessary knowledge on information associated with a problem upon actual resolution of the problem.

6. An end-user experience management server computing device comprising at least one processor and a memory coupled to the at least one processor, the memory storing computer executable programming instructions that, when executed by the at least one processor, configure the end-user experience management server computing device to:

obtain, via at least one network, performance data comprising availability data, performance metric data, and health data from each of a plurality of network devices, applications, and input services in an enterprise network;

generate a key performance indicator (KPI) of each of the network devices, applications and input services using the performance data, a KPI of each of a plurality of base services using the KPIs of the network devices, applications or input services associated with each of the base services, and a key quality indicator (KQI) of each of the base services using the KPIs of each of the base services;

determine when the KPI or KQI of one or more of the base services exceeds a predetermined KPI or KQI threshold level;

automatically generate a composite service quality (CSQ) index of a composite service associated with the one or more base services in real-time using the KQIs of at least the one or more base services, when the determining indicates the KPI or the KQI of the one or more base services exceeds the predetermined KPI or KQI threshold level;

determine when the CSQ index exceeds a predetermined CSQ index threshold level and, when the determining indicates that the CSQ index exceeds the predetermined CSQ index threshold level:

determine when a problem resolution is maintained in the knowledge base based on a correlation of a problem context with the knowledge base, wherein the problem context comprises the CSQ index, the KPIs and KQIs of the one or more base services, and the KPIs and the performance data of one or more of the network devices, applications and input services;

output the problem resolution when the determining indicates the problem resolution is maintained in the knowledge base; and detect one or more possible problem conditions, determine and analyze one or more possible problem scenarios upon detecting the one or more possible problem conditions, and identify one or more actionable items based on the one or more analyzed possible problem scenarios, when the determining indicates the problem resolution is not maintained in the knowledge base.

7. The end-user experience management server computing device of claim 6, wherein the predetermined CSQ index threshold levels comprise a CSQ index minimum value, a CSQ index maximum value, or a range of CSQ index optimal values.

8. The end-user experience management server computing device of claim 6, memory further stores additional computer executable programming instructions that, when executed by the at least one processor, further configure the end-user experience management server computing device to:

determine a CSQ trend based on the one or more previously computed CSQ indices within a predetermined time interval and the CSQ index; and detect the possible problem conditions when the CSQ trend is negative.

9. The end-user experience management server computing device of claim 6, memory further stores additional computer executable programming instructions that, when executed by the at least one processor, further configure the end-user experience management server computing device to analyze information associated with the problem context and identifying the one or more actionable items based on another one or more KPIs and associated base services or one or more network devices, applications, or input services responsible for violation of the CSQ index.

10. The end-user experience management server computing device of claim 6, memory further stores additional computer executable programming instructions that, when executed by the at least one processor, further configure the end-user experience management server computing device to update the knowledge base to include problem resolution data and necessary knowledge on information associated with a problem upon actual resolution of the problem.

11. A non-transitory computer-readable medium having stored therein instructions for improved end-user experience by proactive enterprise network management comprising executable code which when executed by a processor, causes the processor to perform steps comprising:

obtaining, via at least one network, performance data comprising availability data, performance metric data, and health data from each of a plurality of network devices, applications, and input services in an enterprise network;

generating a key performance indicator (KPI) of each of the network devices, applications and input services using the performance data, a KPI of each of a plurality of base services using the KPIs of the network devices, applications or input services associated with each of the base services, and a key quality indicator (KQI) of each of the base services using the KPIs of each of the base services;

determining when the KPI or KQI of one or more of the base services exceeds a predetermined KPI or KQI threshold level;

automatically generating a composite service quality (CSQ) index of a composite service associated with the one or more base services in real-time using the KQIs of at least the one or more base services, when the determining indicates the KPI or the KQI of the one or more base services exceeds the predetermined KPI or KQI threshold level;

determining when the CSQ index exceeds a predetermined CSQ index threshold level and, when the determining indicates that the CSQ index exceeds the predetermined CSQ index threshold level:

determining when a problem resolution is maintained in the knowledge base based on a correlation of a problem context with the knowledge base, wherein the problem context comprises the CSQ index, the KPIs and KQIs of the one or more base services, and the KPIs and the performance data of one or more of the network devices, applications and input services;

outputting the problem resolution when the determining indicates the problem resolution is maintained in the knowledge base; and detecting one or more possible problem conditions, determining and analyzing one or more possible problem scenarios upon detecting the one or more possible problem conditions, and identifying one or more actionable items based on the one or more analyzed possible problem scenarios, when the determining indicates the problem resolution is not maintained in the knowledge base.

12. The non-transitory computer readable medium of claim 11, wherein the predetermined CSQ index threshold levels comprise a CSQ index minimum value, a CSQ index maximum value, or a range of CSQ index optimal values.

13. The non-transitory computer readable medium of claim 11, wherein detecting the one or more possible problem conditions, comprises:

determining a CSQ trend based on the one or more previously computed CSQ indices within a predetermined time interval and the CSQ index; and detecting the possible problem conditions when the CSQ trend is negative.

14. The non-transitory computer readable medium of claim 11, wherein analyzing the one or more determined possible problem scenarios further comprises analyzing information associated with the problem context and identifying the one or more actionable items based on another one or more KPIs and associated base services or one or more network devices, applications, or input services responsible for violation of the CSQ index.

15. The non-transitory computer readable medium of claim 11, further having stored therein at least one additional instruction comprising executable code which when executed by the processor, causes the processor to perform at least one additional step comprising updating the knowledge base to include problem resolution data and necessary knowledge on information associated with a problem upon actual resolution of the problem.

* * * * *